US005243749A

United States Patent [19]

Shultz

[11] Patent Number: 5,243,749

[45] Date of Patent: Sep. 14, 1993

[54] TRANSMISSION PUMP REMOVAL TOOL

[76] Inventor: William E. Shultz, 239 N. Main St., Lombard, Ill. 60148

[21] Appl. No.: 825,346

[22] Filed: Jan. 24, 1992

[51] Int. Cl.[5] .......... B23P 19/04
[52] U.S. Cl. .......... 29/263; 29/271
[58] Field of Search .......... 29/244, 256, 258, 263, 29/264, 265, 270, 271, 273, 281, 426.5

[56] References Cited

U.S. PATENT DOCUMENTS

| | | | |
|---|---|---|---|
| 3,358,352 | 12/1967 | Wilcox | 29/263 |
| 3,408,724 | 11/1968 | Hoeijenbos | 29/263 |
| 4,210,990 | 7/1980 | Krieger | 29/263 |
| 4,383,827 | 8/1981 | Abel | 29/263 X |

*Primary Examiner*—Mark Rosenbaum
*Assistant Examiner*—Peter Dungba Vo
*Attorney, Agent, or Firm*—Marshall, O'Toole, Gerstein, Murray & Borun

[57] ABSTRACT

A tool for removing a transmission pump assembly from within an automatic transmission The tool includes an adjustable driver subassembly for applying torque to a central stator shaft of an automatic transmission, and a pump tool housing includes a plurality of pump tool halves adapted to be grippingly champed about the exterior of transmission pump reaction shafts of various diameters A pump tool housing formed of two pump tool halves, preferably made of aluminum, is secured to the outside surface of the transmission pump reaction shaft by two bolt and nut assemblies. The bolt and nut assemblies are tightened to squeeze the pump tool halves onto the exterior of the transmission pump reaction shaft so that the transmission pump can be pulled centrally off of the transmission stator shaft by torque applied to the stator shaft from a drive bolt threadedly secured to the pump tool halves.

13 Claims, 3 Drawing Sheets

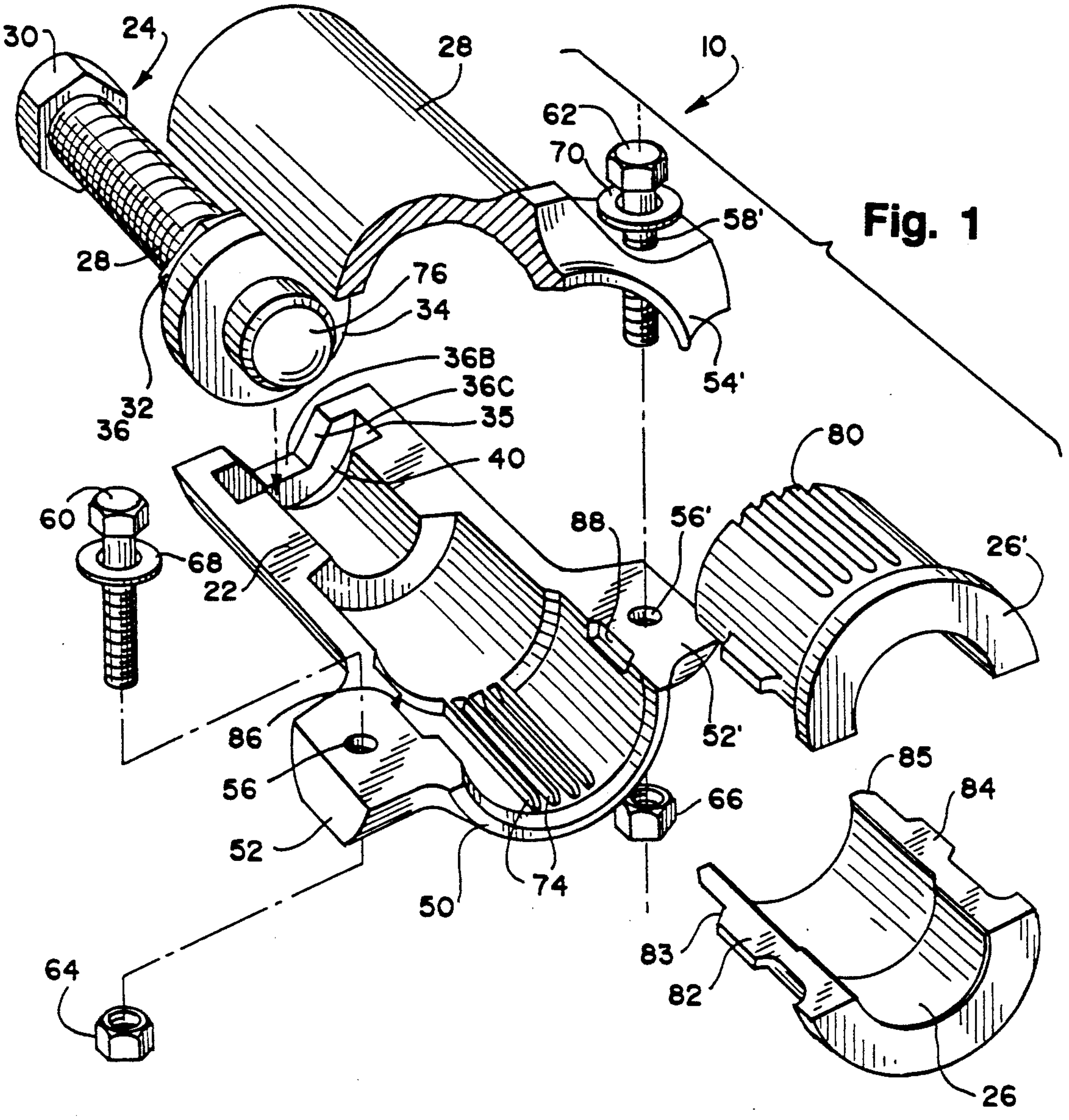
Fig. 1
Fig. 2
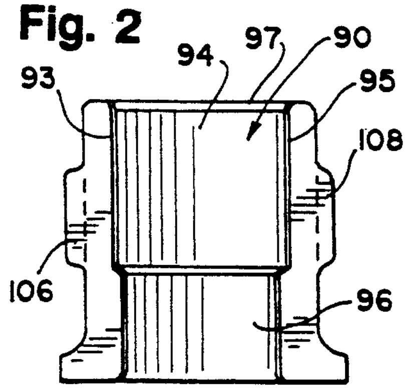
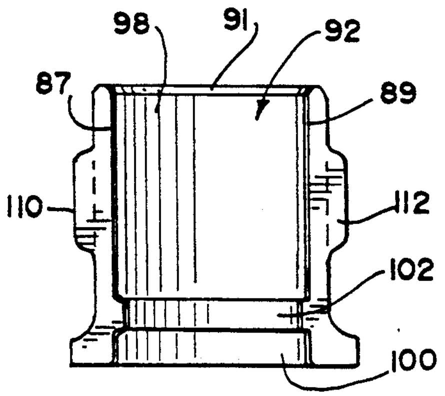
Fig. 3

TRANSMISSION PUMP REMOVAL TOOL

FIELD OF THE INVENTION

The present invention relates to a transmission pump removal tool for extracting a transmission pump assembly from an automatic transmission. More particularly, the present invention is directed to a transmission pump removal tool including two tool halves capable of gripping or clamping an exterior of a transmission pump reaction shaft while a threaded drive bolt is compressed against an interior input shaft to pull the transmission pump centrally off the transmission with uniformly and centrally applied force.

BACKGROUND OF THE INVENTION

Oftentimes it is necessary to remove a transmission pump assembly from an automatic transmission for repair or replacement. The transmission pump assembly includes a central pump shaft or reaction shaft that surrounds an inner transmission shaft or input shaft.

The diameter of the central pump or reaction shaft of the transmission pump assemblies are not standard among the various automobile automatic transmission manufacturers. Presently, the transmission pumps are removed very crudely using hammers, chisels and other tools in an attempt to free the transmission pump reaction shaft from the transmission housing and separate the reaction shaft, that forms a part of the transmission pump, from the interior transmission input shaft. The use of chisels and the like on reaction shafts often damage the transmission pump reaction shaft and cock the transmission pumps unevenly about the input shaft in a back and forth manner making removal very difficult and time consuming.

One of the problems with the use of such crude tools and removal methods is that they do not provide for removal of the transmission pump assembly uniformly and evenly along the longitudinal axis of the transmission pump and reaction shaft and may allow bending or other damage to the transmission pump reaction shaft and/or informal damage, e.g., scathing and scoring of the transmission case at seal locations thereby causing transmission leaks.

In accordance with the present invention, inward force is applied to the input shaft through a threaded drive bolt, while the transmission pump reaction shaft is securely clamped, to pull the transmission pump evenly off of the input shaft.

In this manner, the transmission pump is maintained in alignment surrounding the input shaft during the entire removal process to eliminate any possible damage to the exterior of the input shaft or to an interior or exterior of the reaction shaft on to the transmission case. Removal force is uniformly and centrally applied to the input shaft, without input shaft damage, through a drive bolt capable of applying high torque to free even electrolytically bonded transmission pumps.

SUMMARY OF THE INVENTION

Briefly, the present invention relates to a tool for removing a transmission pump assembly from within an automatic transmission. The tool includes an adjustable driver subassembly for applying torque to a central input shaft of an automatic transmission, and a pump tool housing includes a plurality of pump tool portions or halves adapted to be grippingly clamped about the exterior of transmission pump reaction shafts of various diameters. A pump tool housing formed of two pump tool halves, preferably made of aluminum, is secured to the outside surface of the transmission pump reaction shaft by two bolt and nut assemblies. The bolt and nut assemblies are tightened to squeeze the pump tool halves onto the exterior of the transmission pump reaction shaft so that the transmission pump can be pulled centrally off of the transmission input shaft by torque applied to the input shaft from a drive bolt threadedly secured to the pump tool halves.

Some central transmission pump reaction shafts have splines or ridges on the outside surface and, accordingly, the inside surfaces of the pump tool halves may have complementary shaped splines to provide for better gripping of the transmission pump reaction shaft. The pump tool halves are threadedly connected to the drive bolt through a removable puller nut that is operatively secured between the pump tool halves near one end of the tool housing halves opposite where the transmission pump reaction shaft is gripped. The drive bolt is threaded through the puller nut by axially rotating the drive bolt through the puller nut for contact of the drive bolt against an end of the transmission input shaft. Inward force applied by the drive bolt against an end of the input shaft provides central outward or pulling force to the reaction shaft of the transmission pump evenly around the entire exterior of the transmission pump reaction shaft for easy transmission pump removal.

In accordance with a preferred embodiment, the drive bolt includes a ball bearing rotatably secured within a shaft-contacting end of the drive bolt for central alignment of the drive bolt against the input shaft to prevent damage to the input shaft. The drive bolt also includes an integral drive nut secured at an opposite end of the drive bolt for wrench-connected (torqued) rotation of the drive bolt. Rotation of the drive nut allows for the adjustment of the drive bolt and ball against the transmission input shaft for forcing the transmission pump assembly from the transmission input shaft, gradually and evenly without uneven cocking of the transmission pump due to the central force applied evenly around the transmission pump reaction shaft.

Accordingly, it is an object of the present invention to provide a tool for facilitating removal of a transmission pump assembly from an automatic transmission which solves the problems associated with the prior art.

Another object of the present invention to provide a tool for facilitating removal of transmission pump assemblies having various diameter transmission pump reaction shafts from an automatic transmission.

Another object of the present invention is to provide a tool for facilitating removal of a transmission pump assembly along the longitudinal axis of the transmission pump assembly reaction shaft surrounding an interior transmission input shaft to avoid bending or damage to the transmission shafts.

BRIEF DESCRIPTION OF THE DRAWINGS

These and other objects and advantages of the present invention will be apparent from the following detailed description of the preferred embodiment and accompanying drawings, wherein:

FIG. 1 is a partially cutaway exploded view of the tool for facilitating removal of a transmission pump assembly in an automatic transmission in accordance with the present invention;

FIGS. 2 and 3 are top views of various pump tool boot halves that fit within the pump tool halves for gripping various transmission reaction shafts;

FIG. 7 is a perspective view showing the tightening of the bolt and nut assemblies to tighten the pump tool halves onto a transmission pump reaction shaft;

FIG. 8 is a perspective view showing a driver subassembly being torqued against a transmission stator shaft by rotating the drive bolt;

FIG. 9 is a partially elevated cross-sectional view along line 9—9 of FIG. 8 illustrating the force exerted by the drive bolt against the stator shaft within the interior of a transmission pump reaction shaft to cause the transmission pump to move in an opposite (removal) direction off of the stator shaft;

DETAILED DESCRIPTION OF THE PREFERRED EMBODIMENT

Figure 5:
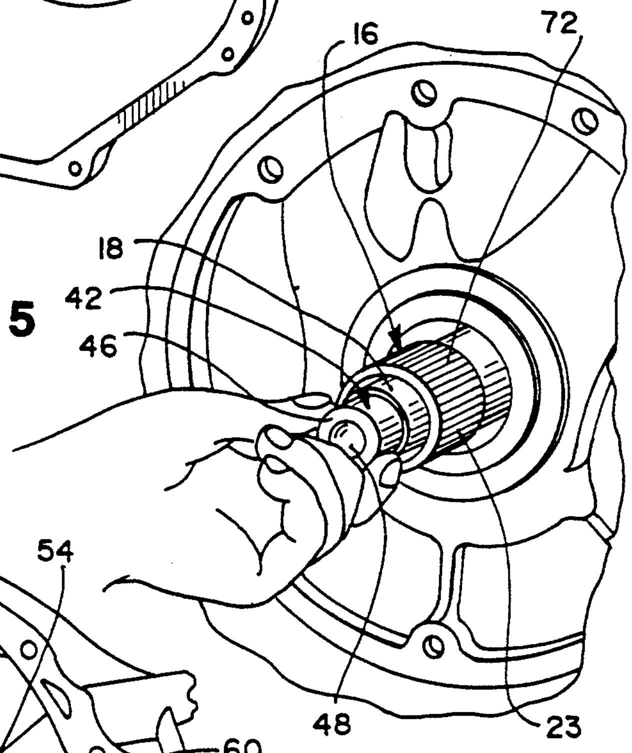
Figure 6:
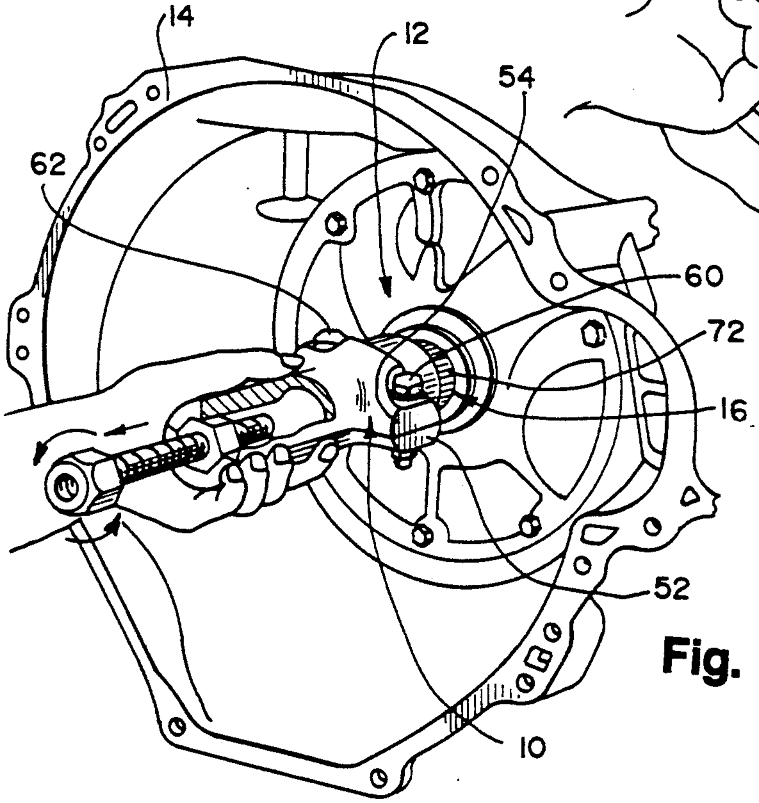
Figure 7:
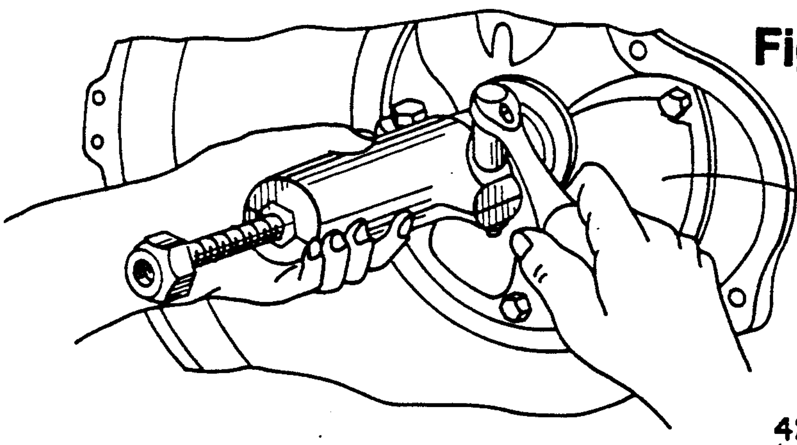
Figure 8:
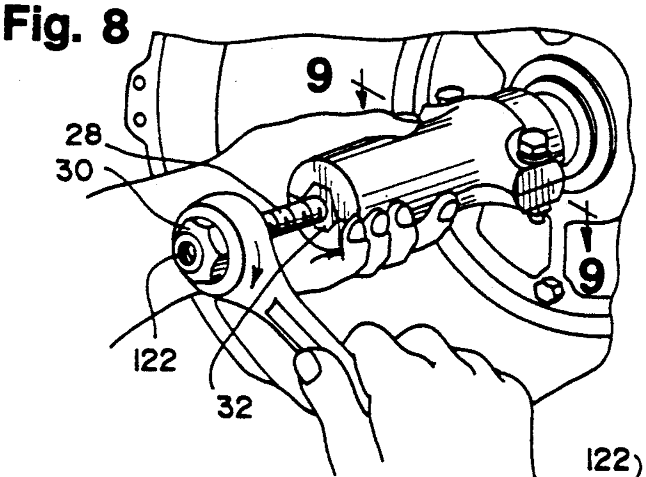
Figure 9:
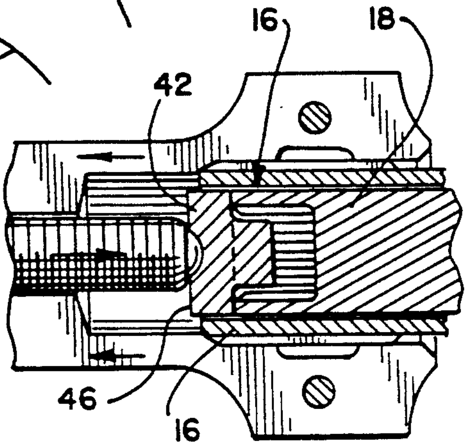

The tool manufactured in accordance with the principles of the present invention is generally identified by reference numeral 10. The tool 10 facilitates removal of a transmission pump assembly 12 from an automatic transmission 14. As illustrated in FIGS. 5 and 6, the tool 10 is operatively secured to surround a transmission pump reaction shaft, generally designated by reference numeral 16, of transmission pump assembly, generally designated by reference numeral 12. The transmission pump assembly 12 and reaction shaft 16 are concentric about an elongate transmission input shaft 18, as best shown in FIGS. 5 and 9.

The tool 10 includes two, preferably identical, gripping housing halves 20 and 22; a driver subassembly generally designated by reference numeral 24; and, preferably, one or more sets of complementary shaped boot halves 26 and 26'. Each set of boot halves, e.g. 26 and 26', are externally shaped complementary to the internal shape of the gripping housing halves 20 and 22 and internally shaped complementary to an external shape of a particular transmission reaction shaft. Each set of boot halves can be positioned within the housing halves 20 and 22, when the pump tool housing halves are loosened, to reduce the internal diameter of the housing halves 20 and 22 to allow the tool 10 to be used with various transmission pump assemblies 12 having various diameter reaction shafts 16. The tool 10 can be used without boot halves 26 and 26' or with pump tool boot halves of various sizes, as illustrated in FIGS. 2 and 3. However, it should be understood by those of ordinary skill in the art that the principles of the invention are equally applicable to tools without pump tool boot halves and to tools where any number of pump tool boot halves are provided for a kit capable of removal of a transmission pump 12 from essentially any transmission 14.

As best shown in FIG. 1, the driver subassembly 24 includes a drive bolt 28, an integral drive nut 30, and a threaded puller nut 32 removably securable to the pump tool halves for threadedly receiving the drive bolt 28. The drive nut 30 is operatively disposed and secured adjacent one end of drive bolt 28 for mechanical advantage for inwardly torquing the drive bolt 28 against an end of a transmission shaft. The puller nut 32 is sized and threaded to allow the drive bolt 28 to be axially rotated within the puller nut 32 for movement of the drive bolt 28 along the length of drive bolt 28. As best shown in FIG. 1 the puller nut 32, in a preferred embodiment, is formed as an integral part of an annular puller washer 34 that preferably also is internally threaded in alignment with the internal threads of the puller nut 32 for increased threaded contact with drive bolt 28.

Each tool housing half 20 and 22 includes a circular washer-receiving recess 35 and a complementary puller nut-receiving locking recess 36 adjacent a distal end 38 of each housing half 20 and 22 for securing puller nut 32 and puller washer 34 within the housing halves 20 and 22, without rotation. The puller nut 32 fits within the puller nut-receiving locking recess 36, identically shaped in each pump tool half 22. Each pump tool half 20 and 22 includes three sides to recess 36, 36A, 36B, and 36C to form a hexagonal recess 36 when the pump tool halves are mated together for receiving the hexagonal puller nut 32, without rotation. The washer 34 fits within the circular recess 35 that includes a washer stop surface 40 to prevent longitudinal movement of the puller nut 32 and washer 34 during torquing of the drive bolt 28 against the input shaft 18. As best shown in FIGS. 5 and 9 and in accordance with the preferred embodiment, a load button, generally designated by reference numeral 42, includes a circular, smaller diameter input shaft-contacting end 44, preferably fitting within the input shaft 18, and a larger diameter drive bolt-contacting end 46 that includes a circular ball bearing-receiving recess 48 for preventing damage to the input shaft 18 while transferring torque from the bolt 28 to the input shaft 18.

As best shown in FIG. 1, pump tool half 22 includes two integral flanges 52 and 52' extending transversely to its longitudinal axis at a proximal or transmission shaft-containing end 50 of pump tool half 22. Pump tool half 20 also includes two complementary shaped transversely extending flanges 54 and 54'. Each flange 52, 52', 54 and 54' includes a bolt-receiving aperture 56, 56', 58 and 58' respectively, disposed such that when the two pump tool halves 20 and 22 are positioned about a transmission reaction shaft 16, aperture 56 is in longitudinal alignment with aperture 58 and aperture 56' is in longitudinal alignment with aperture 58'. A bolt 60 is slidably inserted through apertures 56 and 56' and a bolt 62 is slidably inserted through apertures 58 and 58', and each bolt 60 and 62 is tightened by tightening nuts 64 and 66, respectively, to secure the pump tool halves 20 and 22 securely around the transmission reaction shaft 16. Washers 68 and 80 preferably are included between bolts 60 and 62, respectively, and pump tool half 20, as best shown in FIG. 1.

Figure 4:
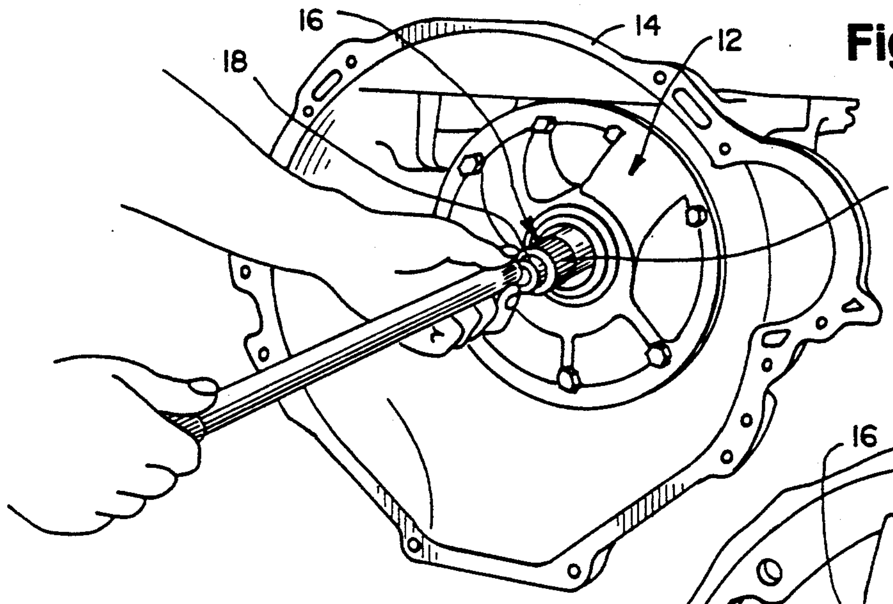
FIGS. 4-9 are perspective views showing various steps in the removal of the transmission pump from an automobile transmission.

As shown in FIGS. 4-6, transmission pump reaction shaft 16 has reaction shaft splines 72 located on the outer surface. These splines 72 are included on the exterior of some reaction shafts 16 but not on others. Accordingly, the proximal end 50 of pump halves 20 and 22 include integral pump half splines 74 shaped complementary to the reaction shaft splines 72 for better gripping of transmission pump reaction shaft splines 72. In accordance with a preferred embodiment, the pump half splines 74 are spaced about 0.002 inch to about 0.005 inch less than a spacing between reaction shaft splines 72 to achieve better gripping of the reaction shaft 72 by the pump tool halves 20 and 22.

As shown in FIG. 1, a ball bearing 76 is rotatably secured within a transmission shaft-contacting end of drive bolt 28. Ball bearing 76 is advanced towards input shaft 18 by rotating drive nut 30 axially clockwise to longitudinally move drive bolt 28 and ball bearing 76 through the puller nut 32 and washer 34 for contact against input shaft 18 or load button 42 to loosen and remove transmission pump assembly 12 from input shaft 18.

Figure 11:
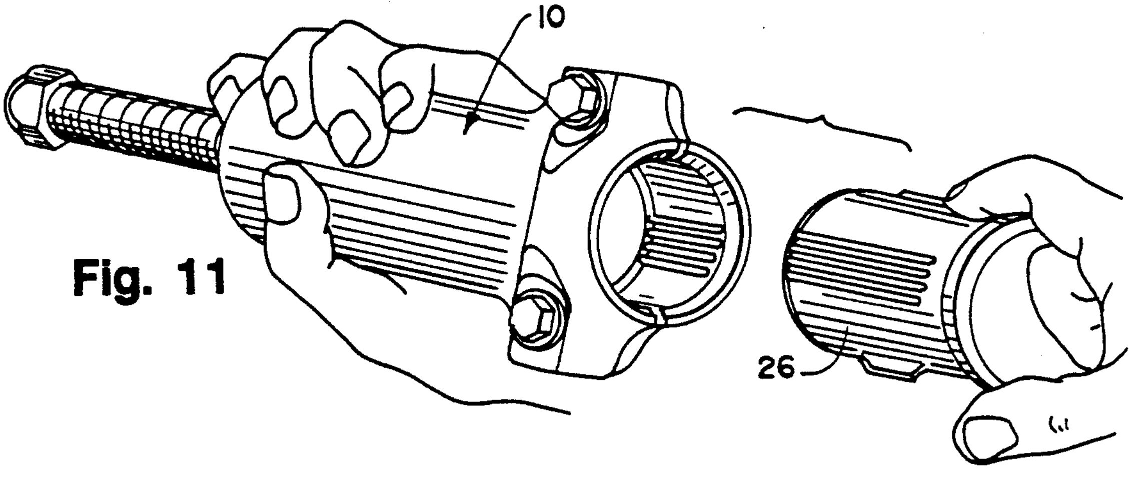
FIG. 11 is a perspective view of a pump tool boot half insertable within the pump tool halves to reduce the internal diameter of the pump tool halves for gripping a smaller diameter transmission pump reaction shaft, before insertion between the housing halves.

As best shown in FIGS. 1 and 11, pump boot halves 26 and 26' include integral exterior splines 80 that fit between pump splines 74 and each boot half 26 and 26' also includes oppositely disposed extending flanges 82 and 84 that fit within complementary-shaped grooves or recesses 86 and 88 (FIG. 1) within the pump tool halves 20 and 22 to allow for flush, non-rotating contact of the exterior surfaces of boot halves 26 and 26' against the interior surfaces of the pump tool halves 20 and 22 at the shaft-contacting end 50 of tool 10. The flanges 82 and 84 are tapered at their distal ends 83 and 85 and the interim surfaces of the boot halves are tapered or bevelled at edges 87, 89, 91, 93, 95 and 97 to form breaks or beveled edges, e.g., 0.060 inch in width so that the boot halves can be slipped into position and nest easily into notches 86 and 88 while sliding over an exterior surface of a reaction shaft without completely separating the two pump tool halves 20 and 22.

In accordance with an important embodiment of the present invention, additional, differently internally shaped pump tool boot halves, generally designated 90 and 92 (FIGS. 2 and 3) are included in a kit for removal of Chrysler and General Motors transmission pumps, respectfully, as well as the Ford transmission pumps that are unwound with the tool 10, without boot halves. Various boots formed from two complementary shaped halves 90 or 92 can be provided in a kit for removal of all extant automobile transmission pumps.

As shown in FIG. 2, boot half 90 includes a lesser diameter recessed portion 94 near the shaft-contacting end 50 of boot half 90 and a greater diameter recessed portion 96 for better gripping contact on the exterior surface of present day Chrysler transmission reaction shafts (not shown) that are wider in diameter near the tool-contacting end (over the length of lesser diameter recessed portion 94) than over the length of greater diameter recessed portion 96 of boot half 90. Similarly, boot half 92 includes lesser diameter recessed portions 98 and 100 with an intermediate, greater diameter recessed portion 102 to fit the exterior shape of a General Motors reaction shaft to assure that the tool 10 does not slip off of the reaction shaft during extraction of the General Motors transmission pump in accordance with the present invention.

Each pair of boot halves 90 (and a complementary-shaped boot half not shown) or 92 (and a complementary-shaped boot half not shown) may be made of varying thicknesses and are inserted into the proximal or shaft-contacting end 80 of pump tool halves 20 and 22 for adaptation to grip various diameter and various externally shaped central transmission pump reaction shafts, e.g. 16. Similar to boot halves 26 and 26', pump tool boot halves 90 and 92 also have integral boot splines (not shown) disposed on their outer surfaces to make contact with the interior surfaces of pump halves 20 and 22, and include flanges 106 and 108 (FIG. 2) and 110 and 112 (FIG. 3) for non-rotating flush contact with the interior surfaces of tool halves 20 and 22.

Figure 10:
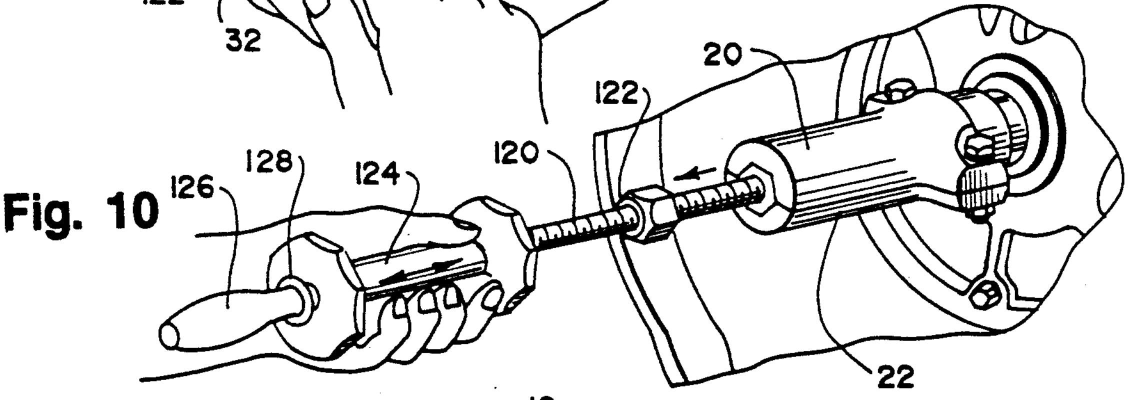
FIG. 10 is a perspective view of a slide hammer operatively connected to an end of the transmission pump removal tool at a drive nut subassembly to loosen and remove the transmission pump assembly.

In accordance with another feature of the present invention, as shown in FIG. 10, an extension rod 120 can be threaded into female threaded end 122 of drive nut 30, after insertion of the extension rod 120 within a longitudinal aperture in a slide hammer 124 for breaking free transmission pump shafts that are difficult to free. The extension rod 120 includes an integral handle 126 having a stop flange 128 so that by forcing the slide handle against flange 128 with sufficient momentum, a sudden impact causing a shock load against flange 128 will break free the transmission pump from the transmission housing, particularly where the transmission pump has been corroded or electrolytically bound to the transmission housing.

Obviously, many modifications and variations of the invention as hereinbefore set forth can be made without departing from the spirit and scope thereof and, therefore, only such limitations should be imposed as are indicated by the appended claims.

What is claimed and desired to be secured by Letters Patent is:

1. A tool for removing a transmission pump axially off of an internally disposed transmission shaft disposed within a transmission pump shaft comprising:
  a tool housing having a pair of complementary shaped housing halves each having splines disposed longitudinally on an internal surface of said housing halves for gripping contact against splines extending outwardly from said transmission pump shaft, said housing including a transmission pump shaft-contacting end and a drive end;
  clamping means for clamping the housing halves securely about essentially only an external surface of the transmission pump shaft and in contact with essentially only an external surface of the transmission pump shaft;
  threaded bolt-receiving means for operatively connecting a threaded bolt to the tool housing near the drive end thereof in alignment with said internal transmission shaft;
  a threaded bolt adapted to be threadedly received in the bolt-receiving means for contacting said transmission shaft, and causing an inward force on said transmission shaft, thereby forcing the tool housing and engaged transmission pump shaft centrally off of the transmission shaft without cocking the transmission pump shaft.

2. A tool as recited in claim 1 therein the clamping means comprises a pair of bolts adapted to threadedly clamp the housing halves together in secure gripping engagement on an exterior surface of the transmission pump shaft.

3. A tool as recited in claim 1 wherein the bolt-receiving means comprises a threaded nut and integral washer disposed within a housing recess near the drive end of the tool housing.

4. A tool as recited in claim 1 wherein the bolt includes a ball bearing rotatably secured to a transmission shaft-contacting end thereof.

5. A tool as recited in claim 1 further including a drive bolt-contacting load button adapted for positioning between a transmission shaft-contacting end of the bolt and the transmission shaft to prevent damage to the transmission shaft.

6. A tool as recited in claim 1 further including a drive nut operatively connected to the threaded bolt for mechanical advantage in rotating the drive bolt against the transmission shaft.

7. A tool as recited in claim 1 further including a slide hammer slidably secured over a connectable longitudinal extension of said drive bolt for creating an axial outward impact on said tool housing for initially breaking the transmission pump shaft free from said internally disposed transmission shaft.

8. A tool as recited in claim 1 further including a tool housing insert shaped to fit within the transmission pump shaft-contacting end of the housing for flush contact between an outer surface of the housing insert and an inner surface of said housing for reducing an internal diameter of the housing at said transmission pump shaft-contacting end of said housing such that with the insert operatively positioned within the housing, the tool can grippingly engage a transmission pump shaft of smaller external diameter.

9. A tool as recited in claim 1, wherein each of said housing halves includes a plurality of splines for engaging the outer surface of said transmission pump shaft.

10. A tool for removing a plurality of transmission pump assemblies having central pump shafts of different outside diameters from the transmission shaft assembly in an automatic transmission comprising:

gripping means for applying a radical inward force to said transmission pump shaft for gripping said transmission pump shaft said gripping means including a tool housing having a pair of complementary shaped housing halves each having splines disposed longitudinally on an internal surface of said housing halves for gripping contact against splines extending outwardly from said transmission pump shaft, said housing including a transmission pump shaft-contacting end and a drive end, and clamping means for clamping the housing halves securely about essentially only an external surface of the transmission pump shaft and in contact with essentially only an external surface of the transmission pump shaft; and separating means for simultaneously applying an axial force to said transmission pump shaft for separating said transmission pump shaft from said inner transmission shaft while gripping said transmission pump shaft.

11. A tool as recited in claim 10, wherein said gripping means includes two pump tool halves, and a plurality of bolt, washer and nut assemblies.

12. A tool as recited in claim 10, wherein said separating means includes a drive bolt operatively connected to said tool and disposed for applying force against said transmission shaft when rotated within said tool.

13. A tool for removing a transmission pump from a transmission shaft of an automatic transmission comprising:

a pair of housing halves, each half including a transmission contacting end and a drive end, said housing halves each including an internal recess shaped for gripping an outer surface of a transmission pump shaft;

a driver subassembly including a threaded drive bolt operatively connected near the drive end of the housing halves for longitudinal movement between the housing halves and contact against a transmission shaft so that longitudinal force applied to the transmission shaft by the drive bolt pulls the transmission pump off of the transmission shaft; and clamping means for securely clamping the housing halves onto essentially only the outer surface of the transmission pump shaft, said clamping means including splines disposed longitudinally on an internal surface of said housing halves for gripping contact against splines extending outwardly from said transmission pump shaft.

* * * * *